INVENTORS.
SHERRIL A. HARMON
EDWARD A. HERRERA
BY
Ronald W. O'Keefe
ATTORNEY

AND-GATE

OR-GATE

FLIP-FLOP

G FLIP-FLOP

A FLIP-FLOP

TIMING LOGIC

May 19, 1970 S. A. HARMON ET AL 3,513,445
PROGRAM INTERRUPT APPARATUS
Filed Sept. 29, 1966 8 Sheets-Sheet 4

$FGS0 = \overline{FGS0}\ DIAG$ $\overline{FGS0} = FGS0\ DIAG + DRAG$ $FGS1 = FGS0\ \overline{FGS1}\ DIAG$ $\overline{FGS1} = FGS0\ FGS1\ DIAG + DRAG$ $FGS2 = FGS0\ FGS1\ \overline{FGS2}\ DIAG$ $\overline{FGS2} = FGS0\ FGS1\ FGS2\ DIAG + DRAG$ $FGS3 = FGS0\ FGS1\ FGS2\ \overline{FGS3}\ DIAG$ $\overline{FGS3} = FGS0\ FGS1\ FGS2\ FGS3\ DIAG + DRAG$ $FGS4 = FGS0\ FGS1\ FGS2\ FGS3\ \overline{FGS4}\ DIAG$ $\overline{FGS4} = FGS0\ FGS1\ FGS2\ FGS3\ FGS4\ DIAG + DRAG$ $FGS5 = FGS0\ FGS1\ FGS2\ FGS3\ FGS4\ \overline{FGS5}\ DIAG$ $\overline{FGS5} = FGS0\ FGS1\ FGS2\ FGS3\ FGS4\ FGS5\ DIAG + DRAG$

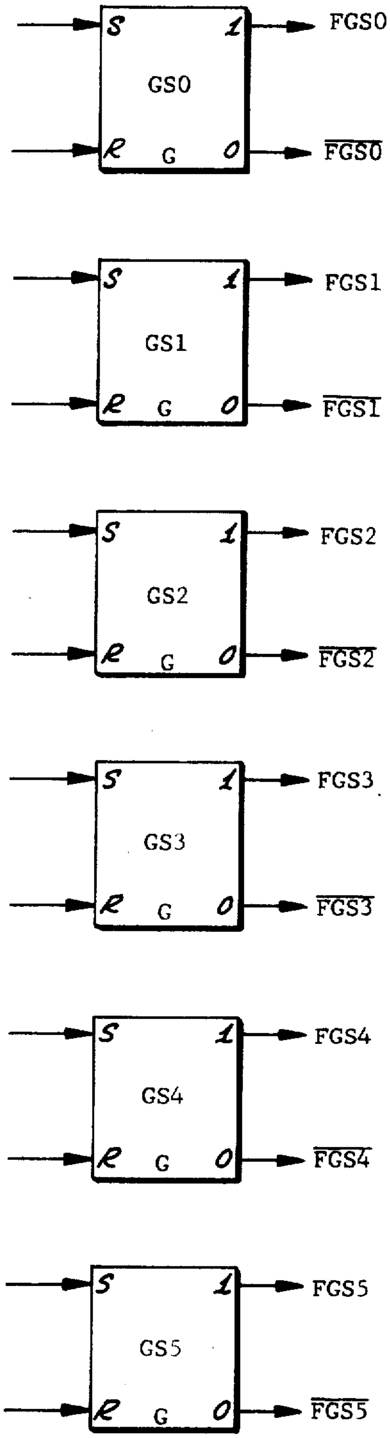

ADDRESS COUNTER

FIG-5

ADDRESS REGISTER $\overline{FA00}\ \overline{FA01}\ \overline{FA02} = DY00$ $FA00\ \overline{FA01}\ \overline{FA02} = DY01$ $\overline{FA00}\ FA01\ \overline{FA02} = DY02$ $FA00\ FA01\ \overline{FA02} = DY03$ $\overline{FA00}\ \overline{FA01}\ FA02 = DY04$ $FA00\ \overline{FA01}\ FA02 = DY05$ $\overline{FA00}\ FA01\ FA02 = DY06$ $FA00\ FA01\ FA02 = DY07$

Y-ADDRESS DECODE LOGIC

Figure 7

$\overline{FA03}\ \overline{FA04}\ \overline{FA05} = DX00$ $FA03\ \overline{FA04}\ \overline{FA05} = DX01$ $\overline{FA03}\ FA04\ \overline{FA05} = DX02$ $FA03\ FA04\ \overline{FA05} = DX03$ $\overline{FA03}\ \overline{FA04}\ FA05 = DX04$ $FA03\ \overline{FA04}\ FA05 = DX05$ $\overline{FA03}\ FA04\ FA05 = DX06$ $FA03\ FA04\ FA05 = DX07$

X-ADDRESS DECODE LOGIC

Figure 8

DX00 (FD00 DY00 + FD01 DY01 + FD02 DY02 + FD03 DY03
+ FD04 DY04 + FD05 DY05 + FD06 DY06 + FD07 DY07)
+ DX01 (FD10 DY00 + FD11 DY01 + FD12 DY02 + FD13 DY03
+FD14 DY04 + FD15 DY05 + FD16 DY06 + FD17 DY07) = CM00

DX02 (FD20 DY00 + FD21 DY01 + FD22 DY02 + FD23 DY03
+ FD24 DY04 + FD25 DY05 + FD26 DY06 + FD27 DY07)
+ DX03 (FD30 DY00 + FD31 DY01 + FD32 DY02 + FD33 DY03
+ FD34 DY04 + FD35 DY05 + FD36 DY06 + FD37 DY07) = CM01

DX04 (FD40 DY00 + FD41 DY01 + FD42 DY02 + FD43 DY03
+ FD44 DY04 + FD45 DY05 + FD46 DY06 + FD47 DY07)
+ DX05 (FD50 DY00 + FD51 DY01 + FD52 DY02 + FD53 DY03
+ FD54 DY04 + FD55 DY05 + FD56 DY06 + FD57 DY07) = CM02

DX06 (FD60 DY00 + FD61 DY01 + FD62 DY02 + FD63 DY03
+ FD64 DY04 + FD65 DY05 + FD66 DY06 + FD67 DY07)
+ DX07 (FD70 DY00 + FD71 DY01 + FD72 DY02 + FD73 DY03
+ FD74 DY04 + FD75 DY05 + FD76 DY06 + FD77 DY07) = CM03

COMPARISON LOGIC

Figure 9

COMPARISON STORAGE LOGIC

TIMING DIAGRAM

United States Patent Office
3,513,445
Patented May 19, 1970

3,513,445

PROGRAM INTERRUPT APPARATUS

Sherril A. Harmon and Edward A. Herrera, Phoenix, Ariz., assignors to General Electric Company, a corporation of New York Filed Sept. 29, 1966, Ser. No. 582,937
Int. Cl. G06f *9/18*
U.S. Cl. 340—172.5 11 Claims

ABSTRACT OF THE DISCLOSURE

Apparatus to terminate execution of a main computer program upon occurrence of a program interrupt request is taught which includes timing logic comprising a clock providing a sequence of timing pulses and circuitry deriving a sequence of delayed pulses therefrom. The timing pulses increment an address counter from an initial count to provide a sequence of identification counts which are stored in an address register. Comparison logic including a plurality of matrices compares the currently-appearing identification counts stored in the address register with any program interrupt request, and incrementing continues until correspondence is achieved between an identification count and a particular program interrupt request, whereupon the logic generates a compare signal. The matrices may be designed to give certain types of program interrupt requests priority in recognition over other types. Comparison storage logic then generates an output signal upon coincidence of the compare signal produced by the comparison logic and one of the delayed pulses from the timing logic. This output signal terminates program execution and inhibits further incrementing of the address counter until the program interrupt request has been serviced. While the program interrupt request is being serviced, a signal issues which resets the address counter to the initial count. After the program interrupt request has been serviced, the corresponding signal is removed from the comparison logic. As a result, the output signal from the comparison storage logic is removed, the address register is reset to its initial count and incrementing proceeds in a similar manner from the initial count until another program interrupt request is identified and recognized.

This invention relates to automatic program interrupt apparatus in a computer system and, in particular, to apparatus for scanning and detecting program interrupt requests.

In the course of execution of a main program in a computer system, certain events may intermittently occur which require predetermined actions to be accomplished in the computer system before the main program is completely executed. Each of these events, for example detection of a process parameter which has exceeded prescribed limits, requires that the main program be interrupted and that an appropriate subroutine or set of instructions be executed to effect the desired action or response to the event. Upon completion of the subroutine, the computer continues execution of the main program from the point of interruption.

Detection of events in the computer system which require interruption of the main program is accomplished concurrently with execution of the main program by apparatus which searches for signals indicating occurrence of such events. These signals are called program interrupt requests. The program interrupt requests are normally assigned a priority relative to each other. The program interrupt request detection apparatus periodically searches or scans for such requests in the sequence of highest to lowest priority. Because a large number of events giving rise to program interrupt requests may occur in a computer system and because a rapid response to certain program interrupt requests may be necessary due to the nature of the corresponding events, it is desirable that the sequential scan or search for program interrupt requests be accomplished rapidly.

It is therefore an object of this invention to provide improved program interrupt apparatus in a computer system.

It is another object of this invention to provide program interrupt apparatus in a computer system which more rapidly responds to program interrupt requests.

It is a further object of this invention to provide a sequential scanning arrangement in program interrupt apparatus which permits more rapid detection and servicing of program interrupt requests.

The foregoing objects are achieved, in the illustrated embodiment of the invention, by providing timing logic which generates a sequence of timing pulses and which provides a delayed pulse corresponding to each timing pulse, the delayed pulse being delayed a predetermined part of the period between successive timing pulses. An address counter is provided to periodically generate a sequence of identification counts in response to the sequence of timing pulses. An address register, in response to the leading edge of each timing pulse provided by the timing logic, stores the current identification count present in the address counter. In response to the trailing edge of the same timing pulse, the identification count in the address counter is incremented by one. The identification count stored in the address register is decoded and applied to comparison logic. The comparison logic also receives existing program interrupt request signals and effects a comparison between the decoded identification count and the existing program interrupt request signals. If correspondence between the decoded identification count and an existing program interrupt request is detected, the comparison logic generates an output signal. The delayed pulse corresponding to the timing pulse enables the output signal of the comparison logic to be stored in flip-flop. The output of the flip-flop causes the computer apparatus to terminate execution of the main program and to perform a subroutine to service the program interrupt request which is identified by the identification count in the address register. If the results of comparisons in the comparison logic are negative, the identification count in the address counter is successively incremented by timing pulses until correspondence between an identification count and a program interrupt request occurs or until a predetermined count is reached. After each servicing of a program interrupt request or when the predetremined count is reached, the address counter is reset to the initial count and the scan of program interrupt requests is repeated. This arrangement permits sequential scanning of program interrupt requests to occur at the frequency of the timing pulses provided by the timing logic.

The subject matter of the invention is particularly pointed out and distinctly claimed in the concluding portion of the specification. The invention, however, both as to organization and method of operation, may best be understood by reference to the following description taken in connection with the accompanying drawings, in which:

FIG. 1 is a block diagram illustrating the program interrupt apparatus of the invention;

FIGS. 2*a*–2*c* illustrate symbols employed to represent circuit elements in the program interrupt apparatus of FIG. 1;

FIGS. 3*a* and 3*b* are circuit diagrams illustrating flip-flops employed in the program interrupt apparatus of FIG. 1;

FIG. 5 illustrates the flip-flop input logical schematic diagrams of the Address Counter employed in the program interrupt apparatus of FIG. 1;

FIG. 7 illustrates the logical combination signal diagrams of the Y-Address Decode Logic employed in the program interrupt apparatus of FIG. 1;

FIG. 8 illustrates the logical combination signal diagrams of the X-Address Decode Logic employed in the program interrupt apparatus of FIG. 1;

FIG. 9 illustrates the logical combination signal diagrams of the Comparison Logic employed in the program interrupt apparatus of FIG. 1;

Program Interrupt Apparatus—General

Figure 1:
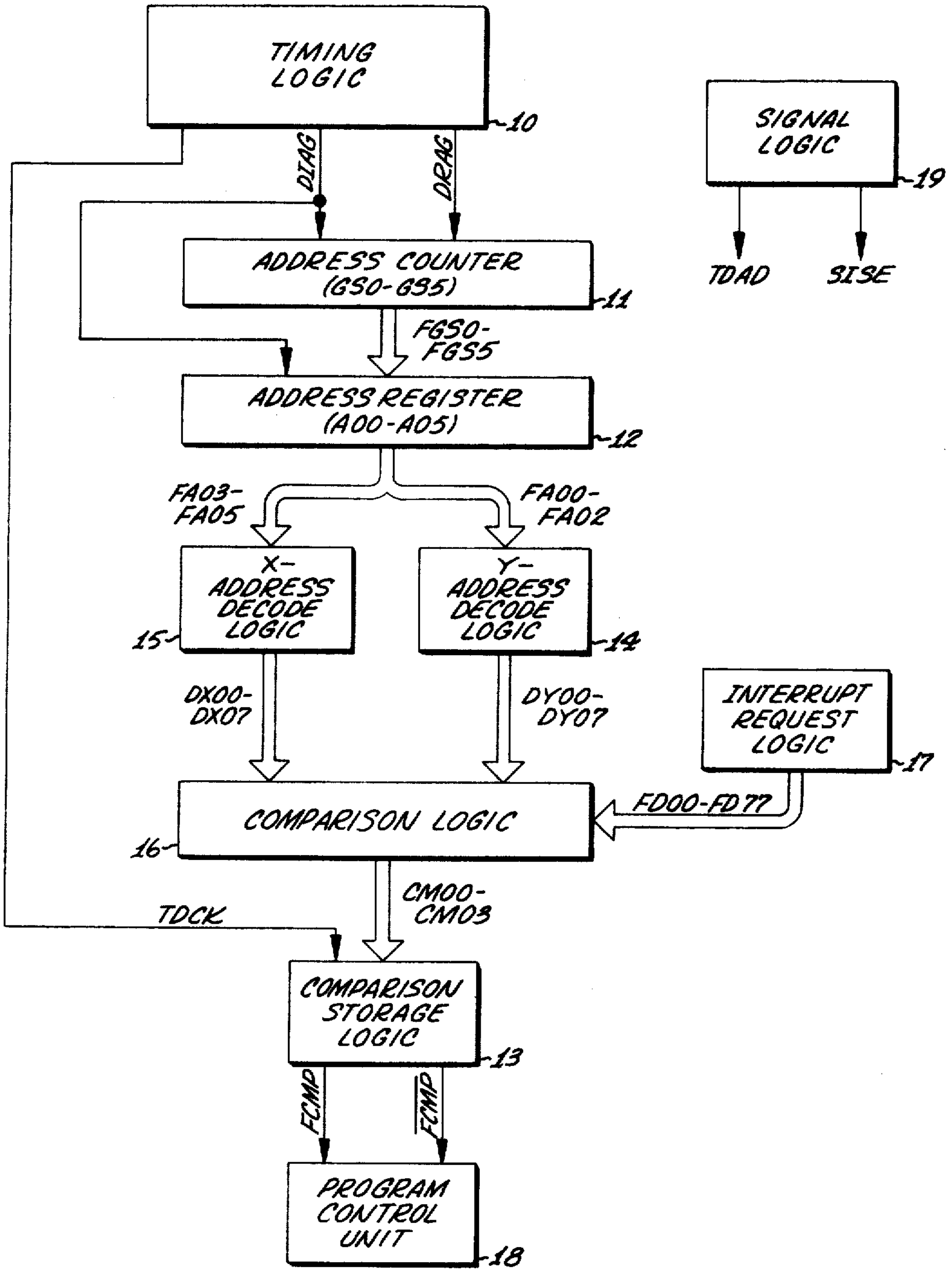
Figure 4:
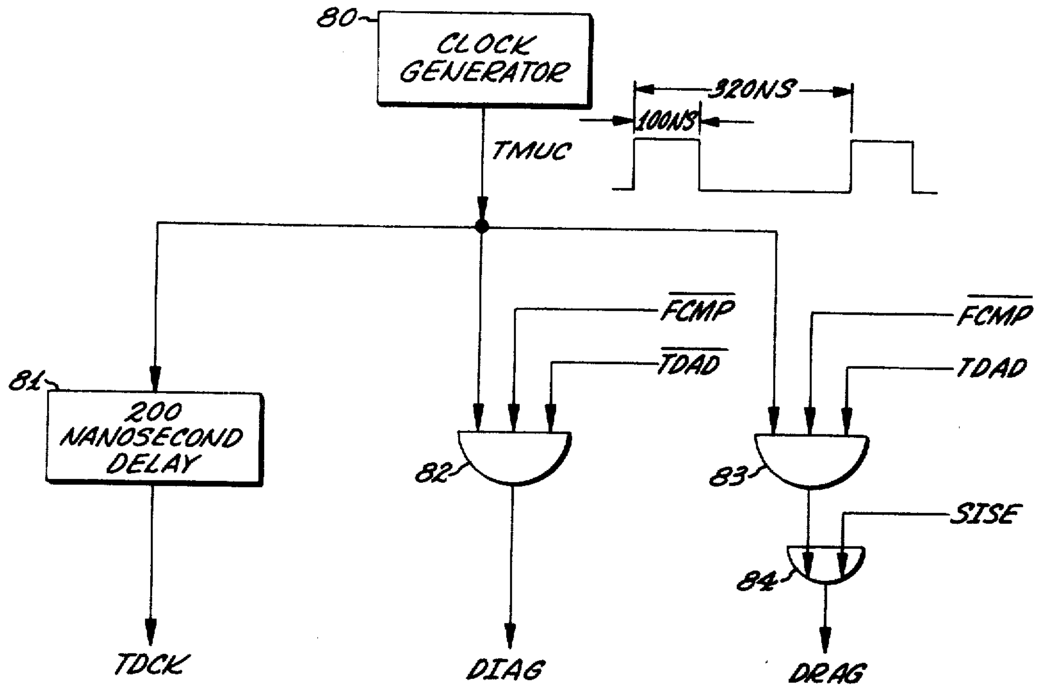
FIG. 4 is a logic diagram of the Timing Logic employed in the program interrupt apparatus of FIG.1.
Figure 11:
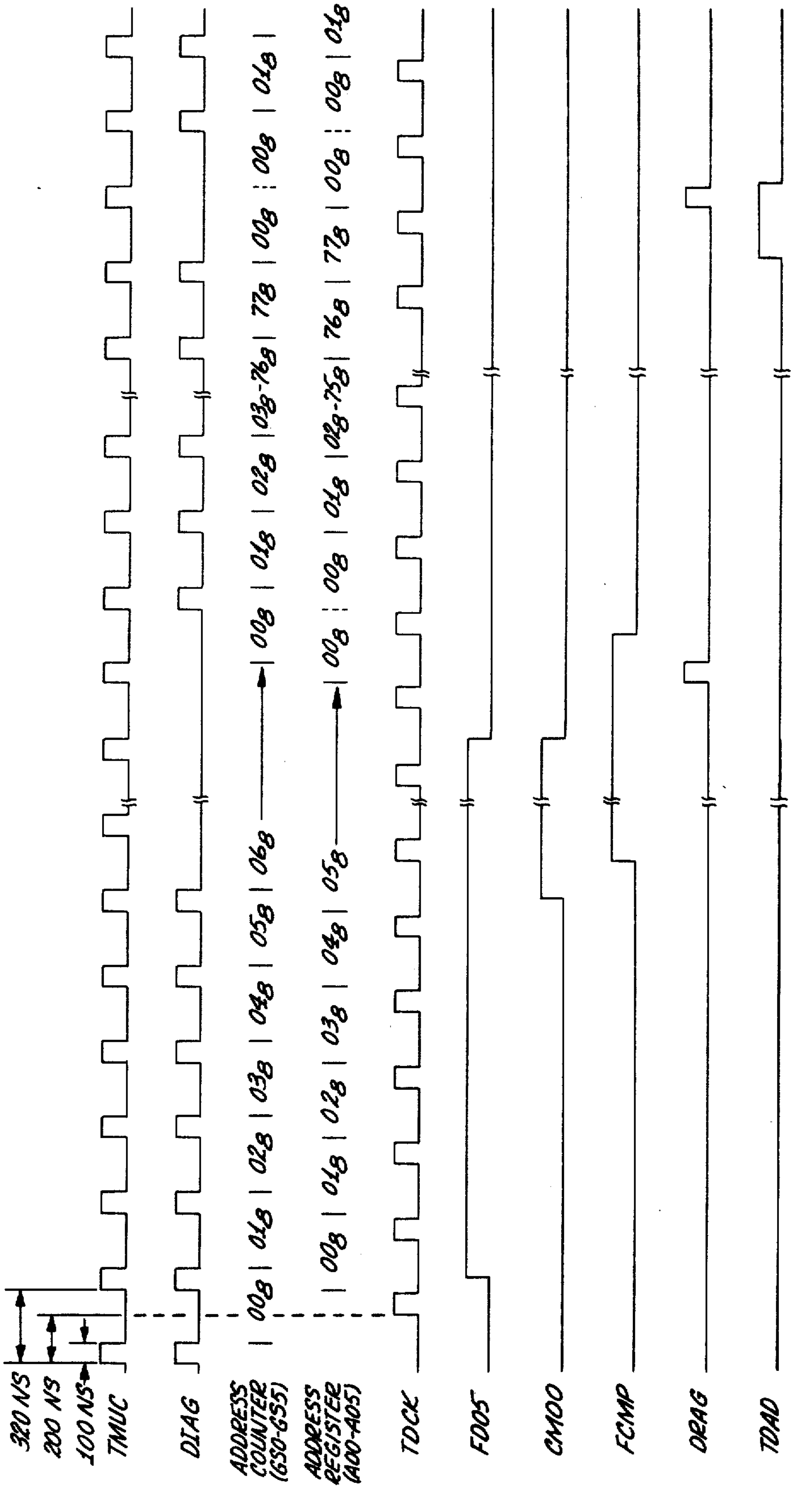
FIG. 11 is a timing diagram illustrating the operation of a program interrupt apparatus of FIG. 1.

With reference to FIG. 1, the program interrupt apparatus of the invention includes Timing Logic 10 which generates timing signals DIAG, delayed signals TDCK and reset signals DRAG. Timing signals DIAG are applied to Address Counter 11 and Address Register 12 while delayed signals TDCK are applied to Comparison Storage Logic 13. Reset signals DRAG generated by Timing Logic 10 are also applied to Address Counter 11. Signals DIAG, TDCK and DRAG comprises voltage pulses, as illustrated in FIG. 11. The details of Timing Logic 10 are illustrated in FIG. 4.

Address Counter 11 is a six-bit counter comprising flip-flops GS0–GS5 and appropriate logic gates. Address Counter 11 is advanced from a count of 000000 (binary) or 00 (octal) to a count of 111111 (binary) or 77 (octal) in response to a sequence of timing signals or pulses DIAG generated by Timing Logic 10, the address or identification count in Address Counter 11 being incremented by one in response to the end or trailing edge of each of timing pulses DIAG. Address Counter 11 is reset to an identification count of 00 (octal) in response to reset signal DRAG. After being reset, the identification count in Address Counter 11 is again advanced in sequence in response to timing pulses DIAG. The identification count in Address Counter 11 is represented by output signals FGS0–FGS5 or the logical inverse signals $\overline{FGS0}$–$\overline{FGS5}$ which indicate the states of individual flip-flops GS0–GS5. The output signals of Address Counter 11 are applied to Address Register 12, as illustrated in FIG. 1. The structure of Address Counter 11 is illustrated by the flip-flop input logical schematic diagrams of FIG. 5.

Address Register 12 is a six-bit register comprising flip-flops A00–A05. Address Register 12 receives the output signals of Address Counter 11 and also timing pulses DIAG generated by Timing Logic 10. Address Register 12 includes appropriate logic gates for effecting the transfer of the address or identification count in Address Counter 11, as represented by its output signals, to Address Register 12 in response to the leading edge of each timing pulse DIAG. Thus, the leading edge of a pulse DIAG causes the count in Address Counter 11 to be transferred to and stored in Address Register 12 while the trailing edge of the same pulse causes the identification count in Address Counter 11 to be incremented by one. These timing relationships are illustrated in the timing diagram of FIG. 11. The output signals FA00–FA02 or the logical inverse output signals $\overline{FA00}$–$\overline{FA02}$ of Address Register 12, which represent the states of flip-flops A00–A02 respectively, are applied to Y-Address Decode Logic 14. The output signals FA03–FA05 or the logical inverse output signals $\overline{FA03}$–$\overline{FA05}$, which represent the states of flip-flops A03–A05 respectively, are applied to X-Address Decode Logic 15. The structure of Address Register 12 is illustrated by the flip-flop input diagrams of FIG. 6.

Y-Address Decode Logic 14 provides one of output signals DY00–DY07, each representing one of the possible combinations of states of flip-flops A00–A02. Similarly, X-Address Decode Logic 15 provides one of output signals DX00–DX07, each representing one of the possible combinations of states of flip-flops A03–A05. The output signals DY00–DY07 and DX00–DX07 of Y-Address Decode Logic 14 and X-Address Decode Logic 15 respectively are applied to Comparison Logic 16. The detailed structure of Y-Address Decode Logic 14 and X-Address Decode Logic 15 is illustrated by the logical combination signal diagrams of FIGS. 7 and 8 respectively.

Interrupt Request Logic 17 is responsive to events which occur either within or external to the computer system and which require interruption of the main program to execute predetermined operations or subroutines. Each of interrupt request signals FD00–07, FD10–17, FD20–27, FD30–37, FD40–47, FD50–57, FD60–67 and FD70–77 (hereinafter referred to as FD00–FD77) is the output signal of one of a plurality of flip-flops in Interrupt Request Logic 17, each of the flip-flops being set to furnish the corresponding interrupt request signal in response to the occurrence of a predetermined event. Each of interrupt request signals FD00–FD77 thus indicates that an event has occurred which requires interruption of the main program and execution of a subroutine or one or more operations in the computer system in order to service the condition giving rise to the event.

Because each event causes a flip-flop to be set, and the flip-flop is not reset until the corresponding program interrupt request is serviced, the output signals of Interrupt Request Logic 17 identify all existing program interrupt requests which have not yet been serviced. Any number of the program interrupt request signals FD00–FD77 may therefore be present at a given time. In order to provide for orderly servicing of program interrupt requests, each request is assigned a priority relative to other requests. In the apparatus illustrated in FIG. 1, the program interrupt request identified by signal FD00 is assigned highest priority and the program interrupt request identified by signal FD77 is assigned lowest priority, with the program interrupt requests identified by signals FD01–FD76 being assigned successively decreasing orders of priority.

Comparison Logic 16 receives signals DY00–DY07 from Y-Address Decode Logic 14, signals DX00–DX07 from X-Address Decode Logic 15 and program interrupt request signals FD00–FD77 from Interrupt Request Logic 17. Comparison Logic 16 comprises a logical matrix which effectively scans or searches for program interrupt requests, represented by signals FD00–FD77, in the order of highest to lowest priority. One of output signals CM00–CM03 is generated by Comparison Logic 16 upon detection of a program interrupt request corresponding to the identification count in Address Register 12. The structure of Comparison Logic 16 is illustrated by the logical combination signal diagrams of FIG. 9.

The scanning or searching for program interrupt requests is effected by signals DY00–DY07 and DX00–DX07, the states of these signals at a given time representing the identification count in Address Register 12. For example, signals DY00 and DX00 are generated by Y-Address Decode Logic 14 and X-Address Decode Logic 15 respectively in response to an initial identification count of 00 (octal) in Address Register 12. If program interrupt request signal FD00 is present, output signal CM00 of Comparison Logic 16 issues to indicate identification of a program interrupt request, the particular program interrupt request detected by Comparison Logic 16 being identified by the identification count in Address Register 12.

Figure 10:
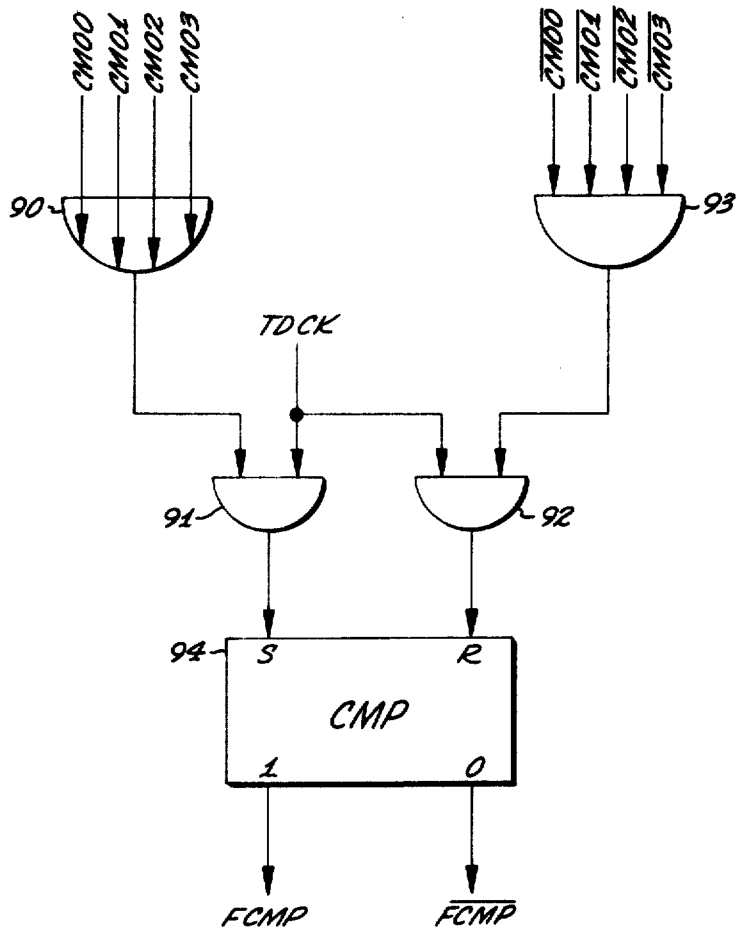
FIG. 10 is a logic diagram illustrating the Comparison Storage Logic employed in the program interrupt apparatus of FIG. 1.

Comparison Storage Logic 13 receives output signals CM00–CM03 of Comparison Logic 16 and delayed pulses TDCK from Timing Logic 10. Comparison Logic 13 includes a flip-flop which is set to the one-state upon coincidence of one of signals CM00–CM03 and a delayed pulse TDCK. Pulse TDCK is delayed with respect to timing pulse DIAG to permit decoding of the contents of Address Register 12 in X-Address and Y-Address Decode Logic units 14 and 15 and to permit the comparison to occur in Comparison Logic 16 prior to storing the result of the comparison in Comparison Logic 13. Output signal FCMP of Comparison Storage Logic 13 indicates that a program interrupt request corresponding to the identification count in Address Register 12 has been detected in the course of scanning or searching while output signal $\overline{FCMP}$ indicates that a program interrupt request has not been detected and that the scanning or searching is to continue. Upon detection of a program interrupt request, signal FCMP is applied to Program Control Unit 18 which causes interruption of execution of the main program in the computer and performance of the subroutine or operation required by the program interrupt request which is identified by the contents of Address Register 12. Signal FCMP also inhibits further application of DIAG pulses to Address Register 12 so that the identification count in Address Register 12 accurately identifies the detected program interrupt request. The structure of Comparison Storage Logic 13 is illustrated in FIG. 10. Signal logic 19, illustrated in FIG. 1, provides miscellaneous signals TDAD and SISE employed in the program interrupt apparatus of the invention.

Circuit elements

Figure 2A:
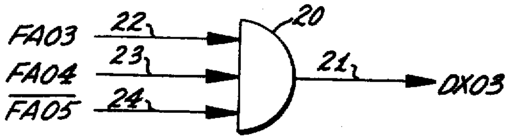

The following circuits are employed as elements of the program interrupt apparatus of FIG. 1: AND-gate, OR-gates and flip-flops. An AND-gate provides the logical operation of conjunction for binary 1 signals applied thereto. Since a binary 1 is represented by a relatively positive potential in the program interrupt apparatus of the invention, the AND-gate provides a positive output signal representing a binary 1 when, and only when, all of the input signals applied thereto are positive and represent binary 1's. The symbol identified by reference numeral 20 in FIG. 2*a* represents a three-input AND-gate. Such an AND-gate delivers a binary 1 output signal on output line 21 only when each of the three input signals applied on the respective input lines 22, 23 and 24 represents a binary 1.

The three input signals applied to AND-gate 20 of FIG. 2*a* are designated FA03, FA04 and $\overline{FA05}$. The output signal of AND-gate 20 is represented by FA03, FA04, $\overline{FA05}$, a conjunctive logic expression. This form of expression is used in logic equations which will be employed in this description to represent a portion of the structure of the program interrupt apparatus of the invention. Alternatively, the output of AND-gate 20 may be identified by another signal designation, such as signal DX03 in FIG. 2*a*. Output signal DX03 of AND-gate 20 is a binary 1, therefore, only when each of input signals FA03, FA04 and $\overline{FA05}$ is also a binary 1. This relationship between the output signal of AND-gate 20, the input signals to AND-gate 20 and the logical operation of conjunction performed by AND-gate 20 may be expressed in the form of a logic equation, viz.:

$$FA03\ FA04\ \overline{FA03}=DX03$$

This logic equation fully represents the conditions necessary to the generation of output signal DX03 and may be employed to structurally represent the relationship between signal DX03 and signals FA03, FA04 and $\overline{FA05}$. The logical operation of conjunction is not limited to AND-gates having three input signals, but instead is applicable to AND-gates having any number of input signals. In each such instance, the output signal of the corresponding AND-gate represents a binary 1 when, and only when, all of the input signals applied to the AND-gate represent binary 1's.

Figure 2B:
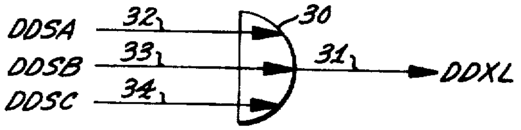

The OR-gate provides the logical operation of inclusive-OR for binary 1 input signals applied thereto. The OR-gate provides a positive output signal representing a binary 1 when any one or more of the input signals applied thereto are positive and represent binary 1's. The symbol identified by reference numeral 30 in FIG. 2*b* represents a three-input OR-gate. Such an OR-gate delivers a binary 1 output signal to output line 31 when at least one input signal applied to input lines 32, 33 and 34 represents a binary 1.

The three input signals applied to OR-gate 30 of FIG. 2*b* are designated DDSA, DDSB and DDSC. The output signal may be represented by $DDSA+DDSB+DDSC$, an inclusive-OR disjunctive logic expression. This form of expression is used in logic equations employed to represent the structure of the program interrupt apparatus of the invention. Alternatively, the output of OR-gate 30 may be identified by another signal designation, such as signal designation DDXL in FIG. 2*b*. Output signal DDXL of OR-gate 30 is a binary 1, therefore, when at least one of input signals DDSA, DDSB and DDSC is a binary 1. This relationship between the output signal of OR-gate 30, the input signals to OR-gate 30 and the logical operation of inclusive-OR performed by OR-gate 30 may be expressed in the form of a logic equation as follows:

$$DDSA+DDSB+DDSC=DDXL$$

This logic equation fully represents the conditions necessary to the generation of output signal DDXL and may be employed to structurally represent the relationship between signal DDXL and signals DDSA, DDSB and DDSC. The logical operation of inclusive-OR is not limited to OR-gates having three input signals, but instead is applicable to OR-gates having any number of input signals. In each such instance, the output signal of the corresponding OR-gate represents a binary 1 when at least one of the input signals applied to the OR-gate is positive and represents a binary 1.

Figure 2C:
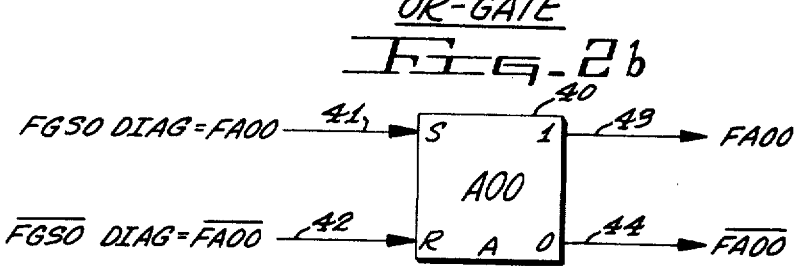

A flip-flop provides temporary storage of a binary digit of information. A pair of output signals is delivered by the flip-flop to denote the type of binary digit which is currently being stored. A flip-flop, or bistable multivibrator, is a circuit adapted to operate in either one of two stable states and to transfer from the stable state in which it is operating to the other stable state upon application of a suitable trigger signal thereto. In one of its stable states (1-state or set state), the flip-flop represents a binary 1 and in the other stable state (0-state or reset state), the flip-flop represents a binary 0. The symbol identified by reference numeral 40 in FIG. 2*c* is employed to represent a flip-flop. Symbol 40, in this instance, represents the A00 flip-flop of Address Register 12. The letter "A" near the bottom of the symbol indicates that the A00 flip-flop is a type A flip-flop, as hereafter described with reference to FIG. 3*b*.

The A00 flip-flop is employed to temporarily store the first or least significant bit of the identification count in Address Register 12. The two lines 41 and 42 entering the left-hand side of the flip-flop symbol are input lines and provide the two required trigger signals. Line 41 provides the set trigger or input signal and line 42 the reset trigger or input signal. When the set trigger signal increases positively, the flip-flop is transferred to its 1-state, if it is not already in the 1-state. When the reset trigger signal increases positively, the flip-flop is transferred to its 0-state if it is not already in the 0-state. The notation $FGS0\ DIAG=FA00$ indicates the logical gate structure employed to generate the set trigger signal. Similarly, the notation $\overline{FGS0}\ DIAG=\overline{FA00}$ indicates the logical gate structure employed to generate the reset trigger signal for the A00 flip-flop.

The two lines 43 and 44 extending from the right-hand side of symbol 40 are output lines which deliver the two output signals viz. FA00 identifying the 1-output signal and $\overline{FA00}$ identifying the 0-output signal. When the A00 flip-flop is in the 1-state, a relatively positive signal is delivered on the 1-output line 43 while a relatively negative signal is delivered on the 0-output line 44. Conversely, when the A00 flip-flop is in the 0-state, a relatively negative signal is delivered on the 1-output line 43 and a relatively positive signal is delivered on the 0-output line 44.

Figure 3A:
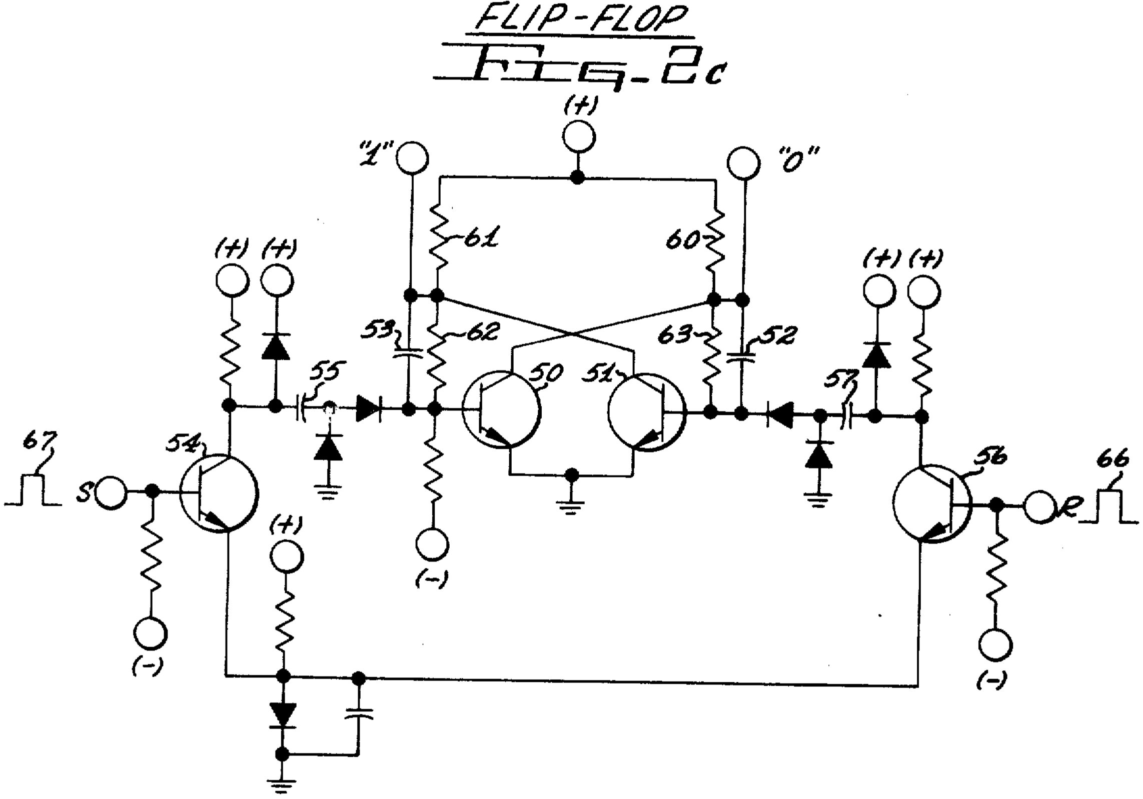

Two types of flip-flops are employed in the program interrupt apparatus of FIG. 1, a type G flip-flop being employed in Address Counter 11 and a type A flip-flop being employed in Address Register 12. Referring to FIG. 3*a*, the type G flip-flop comprises a pair of grounded-emitter NPN transistors 50 and 51. The collector of transistor 50 is coupled to the base of transistor 51 through capacitor 52 and resistor 63. Similarly, the collector of transistor 51 is coupled to the base of transistor 50 through capacitor 53 and resistor 62. The collectors of transistors 50 and 51 are each also connected to a source of positive potential, as illustrated. The set input signal is applied to the base of transistor 50 through NPN transistor amplifier 54 and capacitor 55. The reset trigger signal is applied to the base of transistor 51 through NPN transistor amplifier 56 and capacitor 57. The 1-output signal of the flip-flop is derived at a terminal connected to the collector of transistor 51 and the 0-output signal is derived at a terminal connected to the collector of transistor 50.

In both of the stable states of the flip-flop, one of the transistors 50 and 51 is conducting and the other is non-conducting. Assuming that transistor 50 is conducting and that transistor 51 is non-conducting, current flows from the positive potential surce through resistor 60 and the emitter-collector junction of transistor 50 to ground. Because of the voltage drop in resistor 60, the 0-output signal of the flip-flop is near ground and is a binary 0. Since no current is flowing through transistor 51, there is no voltage drop in resistor 61 and the 1-output signal is near the voltage of the positive potential source and is a binary 1. The potential of the collector of transistor 51 is coupled to the base of transistor 50 through resistor 62, maintaining transistor 50 in a state of conduction. The potential of the collector of transistor 50 is coupled through resistor 63 to the base of transistor 51 maintaining transistor 51 in a state of non-conduction. The flip-flop, as described, is in its 1-state or set state.

Assuming that a positive pulse, as indicated by reference numeral 66 in FIG. 3*a*, is applied to the base of transistor 56, transistor 56 becomes conductive and capacitor 57 is discharged through transistor 56. The non-conductive state of transistor 51 is not affected. At the end or trailing edge of reset trigger pulse 66, transistor 56 becomes non-conductive and the resulting positive pulse at the collector of transistor 56 is differentiated by capacitor 57 and applied to the base of NPN transistor 51, driving transistor 51 into conduction. As transistor 51 becomes more conductive, the negative-going potential of the collector of transistor 51 is coupled through capacitor 53 to the base of transistor 50, driving transistor 50 into a state of non-conduction. The 0-output signal then becomes a binary 1 while the 1-output signal becomes a binary 0. The application of a set trigger pulse 67 to the set input of the flip-flop similarly causes the flip-flop to return to the set state. Thus, the application of a trigger pulse to the set or reset trigger inputs of the type G flip-flop illustrated in FIG. 3*a* causes the flip-flop to change state at the trailing edge of the trigger pulse, if it is not already in the corresponding state.

Figure 3B:
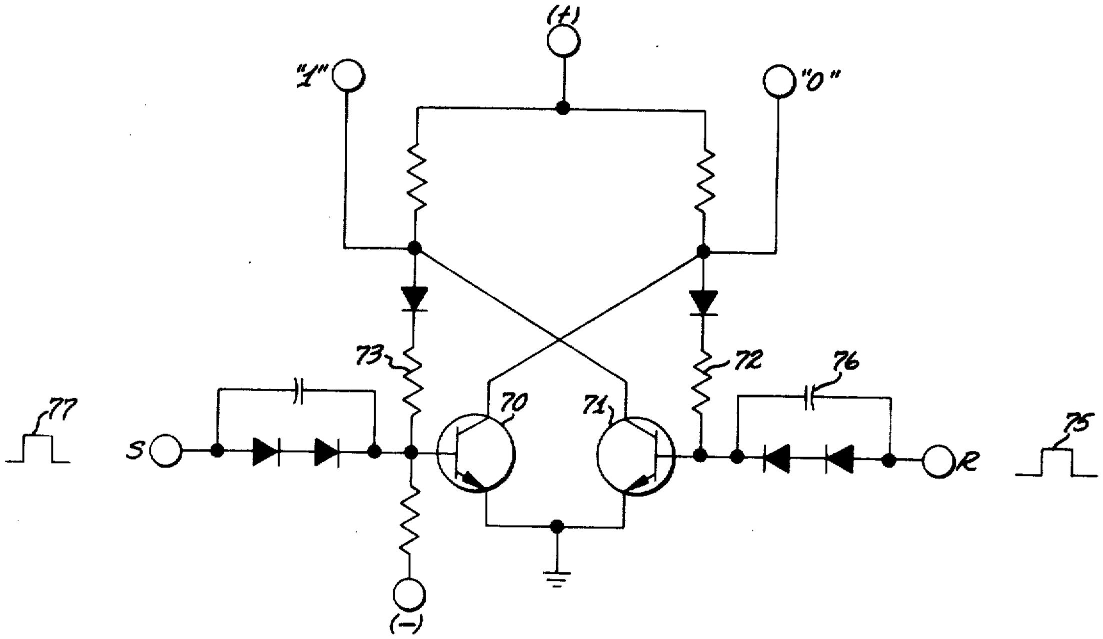

The type A flip-flop which is employed in Address Register 12 of the program interrupt apparatus of FIG. 1 is illustrated in FIG. 3*b*. The type A flip-flop comprises a pair of collector-coupled NPN transistors 70 and 71. The emitter electrodes of transistors 70 and 71 are connected to ground. The collector of transistor 70 is coupled to the base of transistor 71 through resistor 72. Similarly, the collector of transistor 71 is coupled to the base of transistor 70 through resistor 73. The 1-output signal of the type A flip-flop is derived at the collector of transistor 71 while the 0-output signal is derived at the collector of transistor 70, as illustrated. The set trigger pulse is applied to the base of transistor 70 while the reset trigger pulse is applied to the base of transistor 71.

In operation, assuming that transistor 70 is conducting and transistor 71 is non-conducting, the 1-output signal of the type A flip-flop is a binary 1 and the 0-output signal is a binary 0. The flip-flop is therefore in the 1-state or set-state. Upon application of a trigger pulse, identified by reference numeral 75 in FIG. 3*b*, to the reset input terminal, the beginning or leading edge of pulse 75 is differentiated in capacitor 76 and applied to the base of transistor 71, driving transistor 71 into conduction. The resulting lower potential at the collector of transistor 71 is coupled to the base of transistor 70 through resistor 73, driving transistor 70 into a state of non-conduction. The 1-output signal thus becomes a binary 0 and the 0-output signal becomes a binary 1. Upon application of a set trigger pulse 77 to the set input of the type A flip-flop when the flip-flop is reset, the state of the flip-flop is similarly changed at the beginning or leading edge of the set trigger pulse. Thus, in response to set or reset trigger pulses, the state of the type A flip-flop is changed at the leading edge of the pulses, if the flip-flop is not already in the corresponding state.

Logical Schematic Diagram

In the program interrupt apparatus of FIG. 1, two or more output signals from flip-flops and timing pulses signal sources are combined logically by AND-gates and OR-gates to provide input signals to other flip-flops. Thus, the two trigger input signals to a flip-flop are the output signals of respective logical chains of AND-gates and OR-gates which, in turn, receive output signals provided by other flip-flops or by timing pulse signal sources. These logical chains may be described and illustrated by logical expressions which are actually logical schematic diagrams representing the logical and structural interconnection of a logical chain. Thus, the circuits providing the trigger input signals to a flip-flop may be illustrated by a set of logical schematic diagrams for each flip-flop. These logical schematic diagrams are termed herein "flip-flop input" diagrams. Flip-flop input diagrams are employed in FIGS. 5 and 6 to illustrate the logical circuits providing input signals to the flip-flops of Address Counter 11 and Address Register 12 employed in the program interrupt apparatus of FIG. 1.

In addition to flip-flop input diagrams, another type of logical schematic diagram, termed a "logical combination signal" diagram is employed. Certain signals generated within logical chains are identified by signal designations. Such signals are the output signals of a first logical chain and are employed as input signals to one or more additional logical chains. The logical combination signal diagram is a representation of such a first type logical chain. For example, signal DX05 (FIG. 8) is the output signal of a logical chain which receives the 1-output signals of the A03 and A05 flip-flops of Address Register 12 and the 0-output signal of the A04 flip-flop of Address Register 12. The DX05 signal is applied as an input signal to a plurality of logical chains whose output signals, in turn, are received by other elements of the program interrupt apparatus. Logical combination signal diagrams are employed in FIGS. 7, 8 and 9 to illustrate the logical structure of Y-Address Decode Logic 14, X-Address Decode Logic 15 and Comparison Logic 16 in the program interrupt apparatus of the invention.

In the logical circuits represented by the flip-flop input and the logical combination signal diagrams, the logical functions of conjunction are implemented by AND-gates (FIG. 2*a*) and the logical functions of inclusive-OR are implemented by OR-gates (FIG. 2*b*). The use of logical schematic diagrams to provide simple, compact and readily analyzed representations of component structures and to identify signal relationships, circuit elements and circuit relationships is described in detail in U.S. Pat.

3,077,984 issued to Robert R. Johnson and assigned to the assignee in the present invention.

Program Interrupt Apparatus—Details

Referring to FIG. 4 which illustrates the details of Timing Logic 10 of the program interrupt apparatus of the invention, clock generator 80 provides a train of timing pulses TMUC, each pulse having a width of approximately 100 nanoseconds with a period of 320 nanoseconds. Each of the TMUC pulses is applied to delay unit 81 which delays the pulse approximately 200 nanoseconds and provides a corresponding delayed pulse TDCK. Delayed pulses TDCK are employed to permit storage on an output signal of Comparison Logic 16 in Comparison Storage Logic 13.

Each of the TMUC timing pulses is also applied to AND-gate 82. The other inputs to AND-gate 82 are signals $\overline{\text{FCMP}}$ and $\overline{\text{TDAD}}$. The output signal of AND-gate 82 is timing pulse DIAG. Timing pulses DIAG are employed to transfer the identification count in Address Counter 11 to Address Register 12 and to increment Address Counter 11.

Signal $\overline{\text{FCMP}}$ is present at the input of AND-gates 82 if a program interrupt request has not been identified by Comparison Logic 16. Signal $\overline{\text{TDAD}}$ is present if the count generated by Address Counter 11 and stored in Address Register 13 has not yet reached the last or lowest priority program interrupt request in the group of program interrupt requests being scanned. Appropriate logic may be provided to cause signal TDAD to issue when the maximum possible count in Address Counter 11 has been reached or alternatively, if the number of program interrupt requests being scanned is smaller, when a count equal to the number of program interrupt requests being scanned is reached by Address Counter 11. Signal TDAD thus indicates the completion of a scan of program interrupt requests from the highest priority to the lowest priority request and also indicates that Address Counter 11 should be reset to the initial count.

Each of timing pulses TMUC is also applied to AND-gate 83 along with signals $\overline{\text{FCMP}}$ and TDAD. As described above, signal TDAD indicates that Address Counter 11 is to be reset to the initial count preparatory to commencing another of the successive searches for program interrupt requests, while signal $\overline{\text{FCMP}}$ indicates that a program interrupt request has not been identified by Comparison Logic 16. The output of AND-gate 83 is applied to OR-gate 84 along with signal SISE. Signal SISE issues during execution of the subroutine or operations required to service a program interrupt request identified by the program interrupt apparatus. The output signal DRAG of OR-gate 84 thus issues in response to either signal SISE or the output signal of AND-gate 83. Signal DRAG is therefore employed to reset Address Counter 11 to its initial count either during servicing of a program interrupt request or upon completion of a scan or search for program interrupt requests.

FIG. 5 illustrates flip-flop input logical schematic diagrams for the flip-flops GS0–GS5 of Address Counter 11. As indicated, each of the flip-flops of Address Counter 11 is a type G flip-flop. The change of state of each of flip-flops GS0–GS5 thus occurs at the end or trailing edge of timing pulses DIAG provided by AND-gate 82 of Timing Logic 10. The identification count in Address Counter 11 is incremented by one in response to each of pulses DIAG, the logic structure for effecting this incrementation being represented by the flip-flop input diagrams of FIG. 5. Each of the identification counts of Address Counter 11 corresponds to one of the program interrupt requests which may be provided by Interrupt Request Logic 17. Signal DRAG resets each of flip-flops GS0–GS5 to the 0-state upon completion of a scan when no program interrupt request has been identified or during servicing of a program interrupt request.

Figure 6:
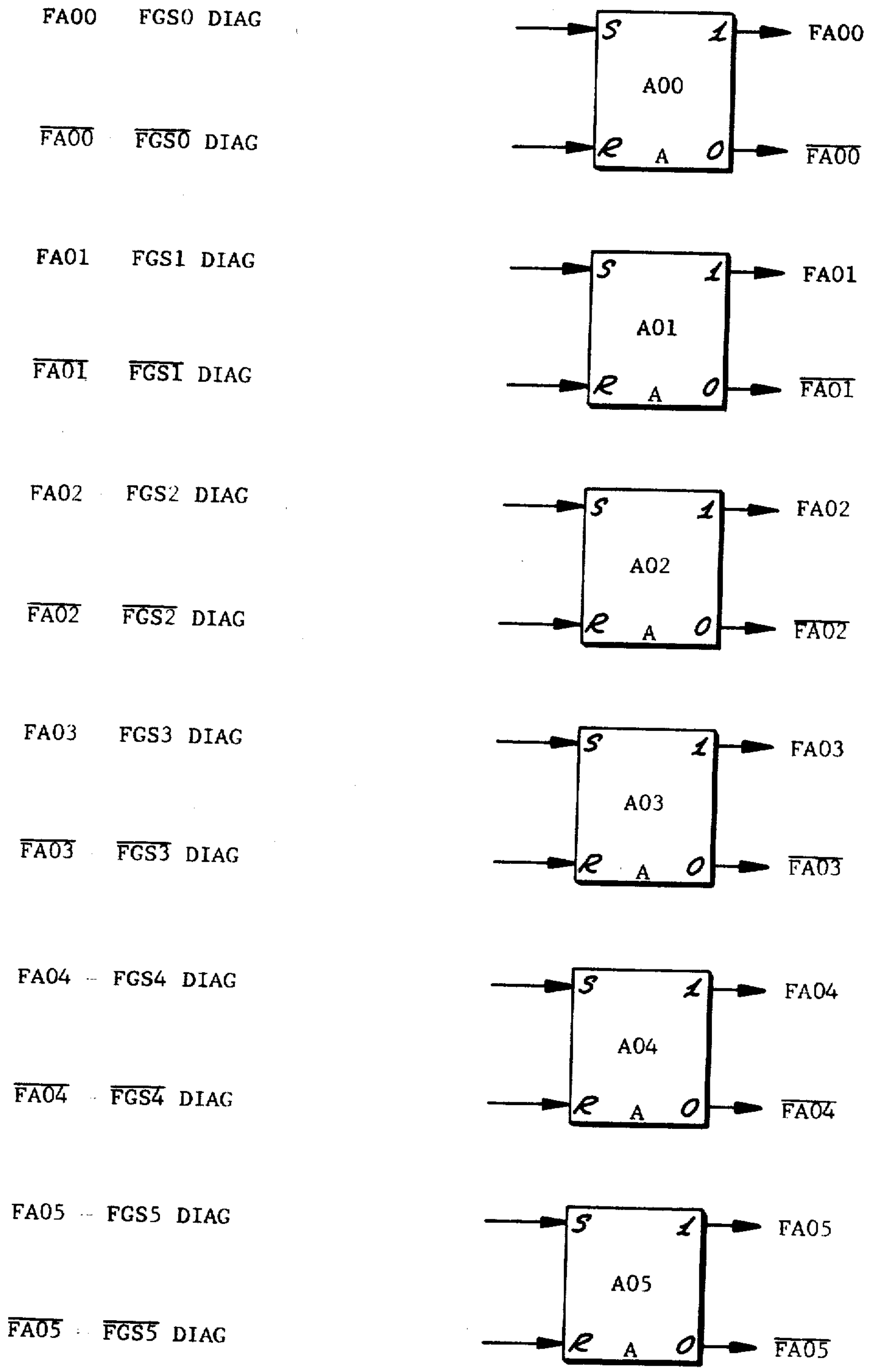
FIG. 6 illustrates the flip-flop input logical schematic diagrams of the Address Register employed in the program interrupt apparatus of FIG. 1.

FIG. 6 illustrates the flip-flop input logical schematic diagrams for flip-flops A00–A05 of Address Register 12. Each of the flip-flops of Address Register 12 is a type A flip-flop, as indicated. Thus, the change in state of each of flip-flops A00–A05 occurs at the beginning or leading edge of each of timing pulses DIAG. As indicated by the flip-flop input diagrams, each of flip-flops A00–A05 stores the state of the corresponding flip-flop of Address Counter 11. Because Address Counter 11 comprises type G flip-flops and Address Register 12 comprises type A flip-flops, timing pulse DIAG causes the identification count in Address Counter 11 to be transferred to Address Register 12 at the leading edge of a timing pulse DIAG while the identification count in Address Counter 11 is incremented at the trailing edge of the same timing pulse.

FIGS. 7 and 8 illustrate the logical combination signal diagrams representing the structure of Y-Address Decode Logic 14 and X-Address Decode Logic 15 respectively. Each pair of signals comprising one of Y-Address Decode Logic output signals DY00–DY07 and one of X-Address Decode Logic output signals DX00–DX07 represents one of the sixty-four possible addresses or identification counts represented by the contents of Address Register 12.

FIG. 9 illustrates the logical combination signal diagrams representing the structure of Comparison Logic 16. As indicated by the logical schematic diagrams of FIG. 9, signal CM00 issues when the identification count or address in Address Register 12 corresponds to one of program interrupt request signals FD00–FD07 and FD10–FD17. FD00 represents the highest priority program interrupt request, with the interrupt request signals FD01–FD07 and FD10–FD17 representing successively lower priority program interrupt requests. Signal CM01 issues when the identification count in Address Register 12 corresponds to one of the program interrupt request signals FD20–FD27 and FD30–FD37. Signal CM02 issues when the identification count in Address Register 12 corresponds to one of the program interrupt request signals FD40–FD47 and FD50–FD57 and signals CM03 issues when the identification count in Address Register 12 corresponds to one of the program interrupt request signals FD60–FD67 and FD70–FD77. Signals FD20–FD27, FD30–FD37, FD40–FD47, FD50–FD57, FD60–FD67, FD70–FD77 represent program interrupt requests of successively lower priority. Thus, for each identification count in Address Register 12, Comparison Logic 16 generates one of signals CM00–CM03, if the corresponding program interrupt request signal is provided by Interrupt Request Logic 17.

Referring to FIG. 10, Comparison Storage Logic 13 comprises OR-gates 90, AND-gates 91, 92 and 93 and CMP flip-flop 94. OR-gate 90 receives signals CM00, CM01, CM02 and CM03 from Comparison Logic 16. The output of OR-gate 90 is applied to AND-gate 91 along with delayed pulse TDCK. In response to one of signals CM00–CM03 and delayed pulse TDCK, a set trigger signal is applied to flip-flop 94 to set flip-flop 94 to the 1-state. The resulting 1-output signal FCMP indicates a positive comparison or identification of a program interrupt request by Comparison Logic 16. Pulse TDCK is delayed relative to pulse DIAG to allow sufficient time for the contents of Address Register 12 to be decoded in Decode Logic units 14 and 15 and for the comparison to occur in Comparison Logic 16.

AND-gate 93 receives signals $\overline{\text{CM00}}$, $\overline{\text{CM01}}$, $\overline{\text{CM02}}$ and $\overline{\text{CM03}}$ from Comparison Logic 16. The output of AND-gate 93 is applied to AND-gate 92 along with delayed pulse TDCK. AND-gate 92 provides the reset trigger signal to flip-flop 94. Flip-flop 94 is thus maintained in its reset state if no program interrupt request is identified by Comparison Logic 16 and is reset to the 0-state after a program interrupt request which causes flip-flop 94 to be set has been serviced.

Program Interrupt Apparatus—Operation

The operation of the program interrupt apparatus of the invention, illustrated in FIGS. 1 and 4–10, will be described in conjunction with the timing diagram of FIG. 11. The continuous sequence of TMUC timing pulses is generated by clock generator 80. Timing pulses DIAG are simultaneously generated in Timing Logic 10 in response to pulses TMUC. The identification count in Address Counter 11 is incremented at the trailing edge of each of pulses DIAG. The identification count in Address Counter 11 is transferred to and stored in Address Register 12 in response to the leading edge of each of pulses DIAG, as illustrated in FIG. 11. The count in Address Counter 11 and Address Register 12 is thus advanced by one in response to each of pulses DIAG, to effect a scan for program interrupt requests.

Delayed timing pulses TDCK is delayed a predetermined part of a period between successive DIAG timing pulses, viz. approximately 200 nanoseconds. Delayed pulses TDCK thus occur between successive DIAG pulses, as shown in FIG. 11. Assuming that program interrupt request signal FD05 has been applied by Interrupt Request logic 17 to Comparison Logic 16, output signal CM00 of Comparison Logic 16 issues after the seventh DIAG pulse, the leading edge of which transfers the identification count of 05 (octal) from Address Counter 11 to Address Register 12. The delayed pulse TDCK corresponding to the seventh DIAG pulse causes flip-flop CMP of Comparison Storage Logic 13 to be set to the 1-state to indicate a positive comparison in Comparison Logic 16 and detection of a program interrupt request. In response to the output signal FCMP of Comparison Storage Logic 13, Program Control Unit 18 causes appropriate interruption of the main program and performance of a subroutine or operations appropriate to servicing the program interrupt request identified by the identification count in Address Register 12.

As indicated in FIG. 4, timing pulse DIAF is inhibited during the period that flip-flop CMP is set to the 1-state. Thus, the counts in Address Counter 11 and Address Register 12 are not changed. During execution of the subroutine or operations which service the program interrupt request, signal SISE issues, causing signal DRAG to issue. Signal DRAG causse the count in Address Counter 11 to be reset to an initial count of 00 (octal) preparatory to performing another scan for program interrupt requests. After the program interrupt request has been serviced, the flip-flop storing the program interrupt request represented by signal FD05 is reset to the 0-state and output signal CMOO in Comparison Logic 16 becomes a binary 0. Flip-flop CMP of Comparison Storage Logic 13 is reset to the 0-state. Timing pulses DIAG begin to issue on the next TMUC clock pulse. DIAG serves to reset Address Register 12 to an initial count of 00 (octal) and to advance the identification count in Address Counter 11 in a renewed search for program interrupt request signals.

Assuming that sixty-four program interrupt requests are being scanned and that no program interrupt requests are detected during the next scan, incrementation of Address Counter 11 continues until the identification count reaches 77 (octal). In response to the decoding of this count in Decode Logic 14 and 15, signal TDAD issues to indicate that the maximum count has been reached. If a lesser number of program interrupt requests are being scanned, appropriate logic is provided to cause signal TDAD to issue when a count equal to the highest number of program interrupt requests to be scanned is reached. As illustrated in FIG. 11, the pulse width and delay of signal TDAD is adjusted so that signal TDAD envelopes the next timing pulse TMUC generated in Timing Logic 10. Signal DRAG then issues in response to timing pulse TMUC, signal TDAD and signal $\overline{\text{FCMP}}$, as described with reference to FIG. 4. Signal DRAG causes Address Counter 11 to be reset to the initial count of 00 (octal).

Upon the resetting of Address Counter 11, $\overline{\text{TDAD}}$ changes to its 1-state and allows for the renewed issuance of timing pulses DIAG. Address Register 12 is reset to its initial count of 00 (octal) and the next scan for program interrupt signals is initiated as shown in FIG. 11. The periodic scanning of program interrupt requests continues with the identification count in Address Counter 11 and Address Register 12 being reset to the initial count each time that a program interrupt request is detected and serviced and each time that the maximum count is reached.

The principles of the invention have been made clear in an illustrative embodiment, but there will be immediately obvious to those skilled in the art many modifications in structure, arrangement, proportions, elements, materials, and components used in the practice of the invention and otherwise, which are particularly adapted for specific environments and operating requirements, without departing from these principles. The appended claims are therefore intended to cover and embrace any such modifications, within the limits only of the true spirit and scope of the invention.

What is claimed is:

1. In combination, timing means for providing a sequence of timing pulses, each of said timing pulses having a leading edge and a trailing edge, logic means for providing one or more of a predetermined plurality of signals, counter means responsive to the trailing edge of timing pulses provided by said timing means for providing different identification counts, each identification count corresponding to a different one of the predetermined plurality of signals which may be provided by said logic means, count storage means responsive to the leading edges of timing pulses provided by said timing means for storing the current identification count provided by said counter means, and comparison means responsive to correspondence between an identification count in said count storage means and a signal provided by said logic means for generating an output signal.

2. In combination, timing means for providing a sequence of timing pulses with a predetermined period between successive timing pulses, each of said timing pulses having a leading edge and a trailing edge, request means for providing one or more of a predetermined plurality of program interrupt requests, counter means responsive to the trailing edge of each of successive timing pulses for providing successive different identification counts, each identification count corresponding to a different one of the predetermined plurality of program interrupt requests which may be provided by said request means, count storage means responsive to the leading edge of each of said timing pulses for storing the current identification count provided by said counter means, and comparison means responsive to correspondence between an identification count in said count storage means and a program interrupt request provided by said request means for generating a comparison output signal indicating identification of a program interrupt request.

3. The combination of claim 2 including means responsive to the comparison output signal for causing said count storage means to retain the identification count corresponding to the program interrupt request for a predetermined time.

4. In combination, timing means for providing a sequence of timing pulses with a predetermined period between successive timing pulses, each of said timing pulses having a leading edge and a trailing edge, request means for providing one or more of a predetermined plurality for program interrupt requests, counter means responsive to the trailing edge of each of successive timing pulses for providing successive different identification counts, each identification count corresponding to a different one of the predetermined plurality of program interrupt requests which may be provided by said request means, count storage means responsive to the leading edge of each of said timing pulses for storing the current identification count provided by said counter means, delay means responsive to said timing pulses for providing delayed pulses, each of said delayed pulses corresponding to one of said timing pulses delayed for a selected part of the predetermined period, and comparison means responsive to a delayed pulse provided by said delay means and to correspondence between an identification count in said count storage means and a program interrupt request provided by said request means for generating a comparison output signal indicating identification of a program interrupt request.

5. In combination, timing means for providing a sequence of timing signals with a predetermined period between successive timing signals, each of said timing signals having a predetermined width, said timing means including delay means for delaying each of said timing signals for a selected part of the predetermined period to provide a delayed signal corresponding to each timing signal, request means for selectively providing one or more of a predetermined plurality of program interrupt requests, counter means responsive to the end of each of successive timing signals for providing successive different identification counts, each identification count corresponding to a different one of the program interrupt requests which may be provided by said request means, count storage means responsive to the beginning of each timing signal for storing the current identification count provided by said counter means, and comparison means responsive to the delayed signal corresponding to the timing signal which caused the current identification count to be stored in said count storage means and responsive to correspondence between the current identification count in said count storage means and a program interrupt request provided by said request means for generating a comparison output signal indicating identification of a program interrupt request.

6. The combination of claim 5 including means responsive to the comparison output signal generated by said comparison means for inhibiting application of additional timing signals to said counter means and to said count storage means.

7. In combination, timing means for providing a sequence of timing pulses with a predetermined period between successive timing pulses, each of said timing pulses having a predetermined width, said timing means including delay means for delaying each of said timing pulses for a selected part of the predetermined period to provide a delayed pulse corresponding to each timing pulse, request means for selectively providing up to a predetermined number of program interrupt requests, counter means for generating a plurality of different identification counts, each identification count corresponding to a different one of the program interrupt requests which may be provided by said request means, count storage means for storing an identification count, comparison means for comparing the identification count in said count storage means and the program interrupt requests provided by said request means, and means responsive to each timing pulse for causing the current identification count generated by said counter means to be stored in said count storage means and for causing the next successive identification count to be generated by said counter means and responsive to the delayed pulse corresponding to each such timing pulse for causing said comparison means to generate a comparison output signal when the identification count in the count storage means corresponds to a program interrupt request provided by said request means.

8. The combination of claim 7 including means responsive to the comparison output signal provided by said last-named means for causing the identification count to be retained in said count storage means.

9. In combination, timing means for providing a sequence of timing pulses with a predetermined period between successive timing pulses, each of said timing pulses having a leading edge and a trailing edge, said timing means including delay means for delaying each of said timing pulses for a selected part of the predetermined period to provide a delayed pulse corresponding to each timing pulse, request means for selectively providing up to a predetermined number of program interrupt requests, counter means for generating a plurality of different identification counts, each identification count corresponding to a different one of the program interrupt requests which may be provided by said request means, count storage means for storing an identification count, comparison means for comparing the identification count in said count storage means and the program interrupt requests provided by said request means, and means responsive to the leading edge of each timing pulse for causing the current identification count generated by said counter means to be stored in said count storage means and responsive to the trailing edge of the same timing pulse for causing a different identification count to be generated by said counter means and responsive to the delayed pulse corresponding to the timing pulse for causing said comparison means to generate a comparison output signal if the identification count in the count storage means corresponds to a program interrupt request provided by said request means.

10. In combination, timing means for providing a sequence of timing pulses with a predetermined period between successive timing pulses, each of said timing pulses having a leading edge and a trailing edge, said timing means including delay means for delaying each of said timing pulses for a selected part of the predetermined period to provide a delayed pulse corresponding to each timing pulse, request means for selectively providing up to a predetermined number of program interrupt requests, counter means responsive to the trailing edge of each of successive timing pulses for providing a sequence of different identification counts beginning with an initial identification count, each identification count corresponding to a different one of the program interrupt requests which may be provided by said request means, count storage means responsive to the leading edge of each timing pulse for storing the current identification count provided by said counter means, comparison means responsive to a delayed pulse and to correspondence between the identification count in said count storage means and a program interrupt request provided by said request means for generating a comparison output signal indicating identification of the program interrupt request, means responsive to the comparison output signal for inhibiting application of additional timing pulses to said count storage means, and means responsive to the comparison output signal for causing said counter means to return to the initial identification count and begin generation of another sequence of identification counts.

11. In combination, timing means for providing a sequence of timing pulses with a predetermined period between successive timing pulses, each of said timing pulses having a leading edge and a trailing edge, said timing means including delay means for delaying each of said timing pulses for a selected part of a predetermined period to provide a delayed pulse corresponding to each timing pulse, request means for selectively providing up to a predetermined number of program interrupt requests, counter means responsive to the trailing edge of each of successive timing pulses for providing a predetermined sequence of different identification counts beginning with an initial identification count, each identification count of the sequence correspondng to a different one of the program interrupt requests which may be provided by said request means, count storage means responsive to the leading edge of each timing pulse for storing the current identification count provided by said counter means, decode means responsive to the identification count in said address register for generating corresponding output signals, comparison logic means responsive to the output signals of said decode means and to the program interrupt requests provided by said request means for generating an output signal when the current identification count in said count storage means corresponds to a program interrupt request, bistable storage means responsive to the output signal of said comparison logic means and to the delayed signal corresponding to the timing signal which caused the current identification count to be stored in said count storage means for generating a comparison signal, means responsive to the comparison signal generated by said bistable storage means for inhibiting application of additional timing pulses to said count storage means, and means responsive to the comparison signal generated by said bistable means for causing said counter means to return to the initial identification count and begin generation of another predetermined sequence of identification counts.

References Cited

UNITED STATES PATENTS

| | | | |
|---|---|---|---|
| 3,222,647 | 12/1965 | Strachey | 340—172.5 |
| 3,290,658 | 12/1966 | Callahan et al. | 340—172.5 |

OTHER REFERENCES

IBM Technical Disclosure Bulletin, vol. 4, No. 12, May 1962, pp. 57–58, J. R. Kersey.

RAULFE B. ZACHE, Primary Examiner